United States Patent
Schwartz

[11] 3,941,176
[45] Mar. 2, 1976

[54] SAFETY TIRE

[75] Inventor: Harold Gordon Schwartz, Akron, Ohio

[73] Assignee: E. I. Du Pont de Nemours and Company, Wilmington, Del.

[22] Filed: Apr. 4, 1975

[21] Appl. No.: 565,080

[52] U.S. Cl. ............ 152/340; 152/330 RF; 152/400
[51] Int. Cl.² ...................... B60C 17/00; B60C 5/06
[58] Field of Search ..... 152/339, 340, 158, 330 RF, 152/354, 357 A, 379, 400

[56] References Cited
UNITED STATES PATENTS

| | | | |
|---|---|---|---|
| 3,034,557 | 5/1962 | Beckadolph | 152/340 |
| 3,085,615 | 4/1963 | Sanderson | 152/340 |
| 3,578,056 | 5/1971 | Wynbelt | 152/340 |
| 3,860,052 | 1/1975 | Schroeder | 152/354 |
| 3,885,614 | 5/1975 | Fujikawa | 152/340 |

Primary Examiner—Drayton E. Hoffman

[57] ABSTRACT

A two-chamber safety tire for automotive vehicles capable of supporting the weight of the vehicle when either partially or completely deflated, thus allowing continued operation of up to about 50–100 miles. The outer chamber is constituted of an ordinary tubeless tire, while the inner chamber has no fabric reinforcement and is made of a thermoplastic elastomer having defined strain-stress properties. Particularly suited thermoplastic elastomers include polyetheresters and polyurethanes. The thickness of the inner chamber in sidewall and tread areas of the casing must be such that defined maximum strain and creep requirements at a stated pressure are observed.

26 Claims, 1 Drawing Figure

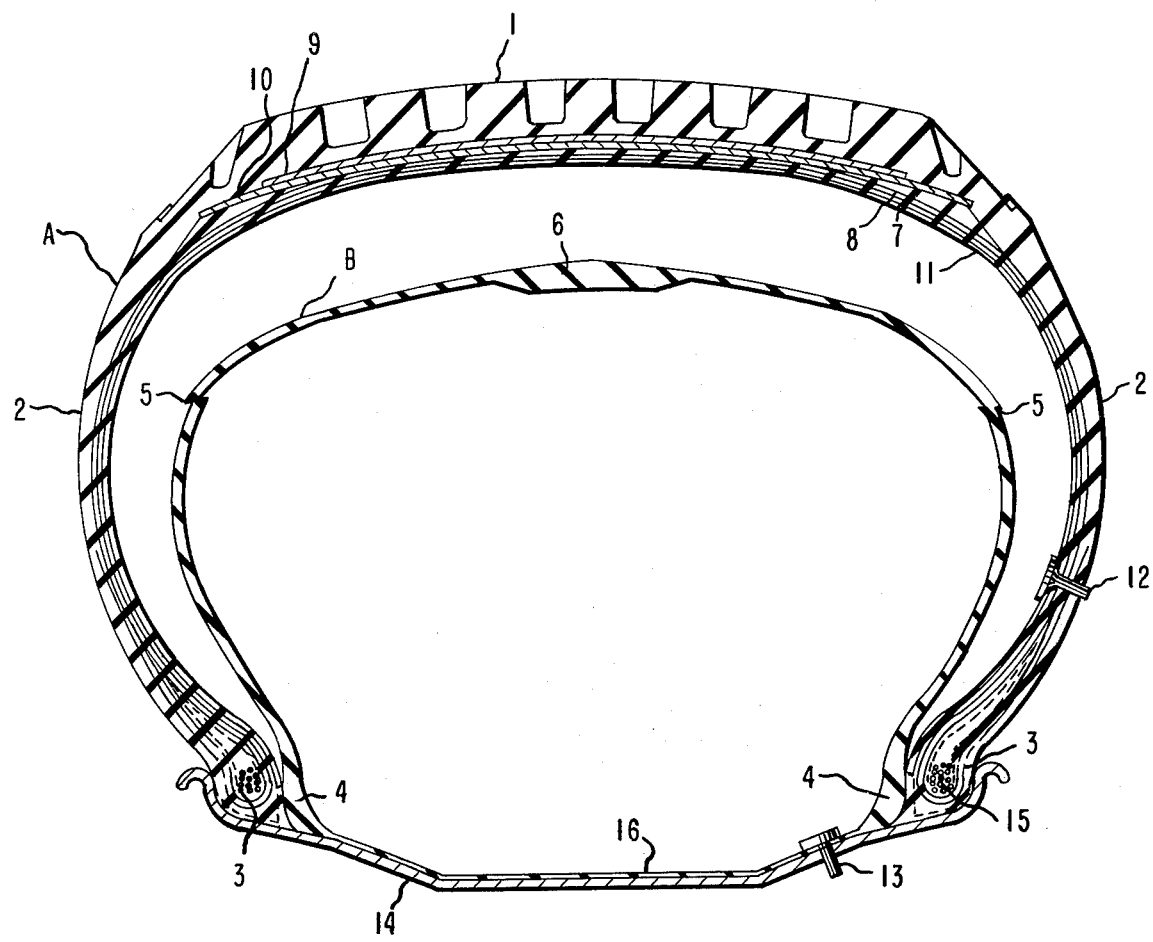

SAFETY TIRE

BACKGROUND OF THE INVENTION

This invention relates to a new safety tire for automotive vehicles.

Pneumatic tires for automobiles, trucks, and other automotive vehicles have been used for many years. While the first tires were made of a fairly porous rubber and had to be used in conjunction with an inner air chamber, tubeless tires were introduced in about 1950; these became standard in the automotive industry. Tubeless tires have a special lining on their inner surface, capable of retaining air under pressure. When a tire is punctured by a sharp object, for example, a nail, it loses air and is incapable of supporting the weight of the vehicle. The tire (or the inner chamber, if the tire is not tubeless) must then be repaired. However, often a puncture will occur at some distance from a service station where the repair can be performed. Since running flat would ruin the tire, the wheel must be replaced, and it thus is necessary to always carry a spare tire mounted on a wheel.

There are many persons, however, who are unable to change the wheel because of its size or weight. Changing a wheel at night or along a busy highway could be dangerous even to those able to handle the task. The spare wheel usually is carried in the trunk of an automobile, where it takes valuable storage space. If luggage is carried in the trunk, it often must be removed before the spare wheel can be reached. The ideal solution to the problem would be to have tires which either could not be punctured or, even if they are punctured, could run for a considerable distance without requiring immediate replacement or repair.

Various safety tires have been proposed in the past. Often, they are of double-chamber construction, wherein the inner chamber serves as a tire within a tire and is capable of supporting the weight of the vehicle for some distance. The prior art safety tires suffer from many shortcomings, the most common problems being (1) the difficulty in mounting both chambers on the same rim, and (2) the tendency of both chambers when flat to fall off the rim at even moderate speeds. Various such designs also caused considerble wheel balancing problems.

Furthermore, prior art double-chamber tires required fabric reinforcement of the inner chamber to render the chamber practically inextensible at operating pressures. This requirement necessitated complicated fabricating techniques. Some currently available safety tires are of single chamber construction and can run flat. This result is achieved by thickening the sidewalls, providing an internal lubricant, and installing the tires on special rims. The thickened sidewalls result in high operating temperatures, even when inflated, and in high cost.

There is, therefore, great need in the art for a safety tire that would be easy to install; when deflated, would remain seated on the rim during the operation of the vehicle; and, while deflated, would be capable of supporting the weight of the vehicle for a considerable distance at moderate speeds.

SUMMARY OF THE INVENTION

According to this invention, there is now provided a pneumatic automotive safety tire consisting of a nonporous, fabric-reinforced outer casing and of a separate, toroidally shaped inner chamber, having no fabric reinforcement and being constructed of a thermoplastic elastomer selected from copolyetheresters and polyurethanes which exhibit a strain of not more than 10% when subjected to a tensile stress of 300 psi for 1 minute at 91°C. and not more than 15% for 100 minutes at 91°C.; the thickness of the inner chamber in the sidewall and tread areas of the casing being such that the vector sum of the principal strains of the chamber in those areas at a pressure of 24 psig is not greater than 10%, and maximum creep at 24 psig at a temperature of 91°C. after 100 minutes is 5% (preferably, 3%); the outer chamber and the inner chamber being each inflatable through a separate valve to the normal operating pressure of about 24–30 psig; and the size of the inner chamber, when inflated, being such that the inner chamber fills more than 50% of the volume within the casing.

THE DRAWING

The drawing presents a cross-sectional view of a typical tire of the present invention.

DETAILED DESCRIPTION OF THE INVENTION

The safety tire of the present invention is mounted on a standard wheel rim and uses a standard tubeless tire as the outer chamber or casing. The casing is modified to accommodate a valve. In order for the inner chamber to be able to support the weight of moving vehicle with deflated outer chamber, it is necessary that the inner chamber be made of a high modulus elastomer having high resistance to creep.

The cross-sectional profile of the inner chamber will be selected to complement the cross-sectional shape of the casing in which it is to be used. The preferred size of the inner chamber is 70–80% of the volume within the tire casing, thus minimizing the change of wheel diameter in the event of puncture of the casing. The toroid is so shaped that it contacts the casing only in the area of the beads during operation under full inflation. The distance between the apogee of the inner chamber and the casing in the tread area is not critical, the reduced susceptibility of the inner chamber to puncture being more dependent on the separation of the inner chamber from the casing than on the distance from the casing.

Referring now to the drawing, which is a section through the center plane of a typical tire, A is the casing having three main sections: tread 1, sidewalls 2, and beads 3. B is the inner chamber, which has thicker sidewalls in the bead area 4 to provide proper seating of the chamber during the chamber inflation operation and to keep the chamber properly seated when running flat. The chamber is provided with narrow thinner sections 5 in the shoulder area to provided proper folding of the chamber for running flat capability in the event of total deflation when both chambers are punctured. These thinner sections need be no more than a superficial circumferential scoring of the chamber surface around the chamber wall. The chamber section 6 in the apogee is thickened to hold a low profile shape, that is, where the rim to tread distance is small relative to the distance between the sidewalls. Such a configuration has the best capability for running flat. For this reason, the preferred casing is a radial casing having low profile.

The casing in the drawing has two body plies 7 and 8 and two steel belt plies 9 and 10. The casing is lined on its inner surface with an elastomeric liner 11 usually of natural rubber, chlorobutyl rubber, or a combination of the two. The casing is provided with a built-in valve 12 for inflation with a needle inflator. The inner chamber is inflated through an ordinary tire valve 13 placed in the wheel rim 14. The casing beads are reinforced, for example, with steel wire 15.

The wall thickness of the inner chamber in the rim area 16 should be preferably such that a vector sum of the principal strains of at least 20% is obtained at an inflation pressure of 24 psig. The wall thickness of the chamber in the remaining areas may be uniform or variable.

The term "vector sum of the principal strains of the chamber" is well known to the art. It is measured by placing strain gauges on the surface of the chamber, inflating the chamber to the specified pressure and recording the strains, and calculating their vector sum.

It is to be noted that a typical tire illustrated in the drawing embodies a number of desirable or preferred features, which are not essential for the operability of this invention but merely provide additional convenience. The critical requirements are the strain and creep figures for the chamber walls in the tire sidewall and tread areas, as recited in the Summary of the Invention.

The strain-stress relationship required for the elastomers suitable for the construction of the inner chamber is determined according to ASTM Method D-674.

The preferred elastomers suitable for the construction of the inner chamber would exhibit a strain of not more than 10% when subjected to a tensile stress of 500 psi for 1 minute at 91°C. Elastomers which do not satisfy the stress-strain requirements recited in the Summary of the Invention would require impractically thick walls in sidewall and tread areas to prevent the chamber from protruding through a puncture in the casing. Furthermore, a chamber of such an elastomer would add weight to the tire and, because of its bulk, would make installation within the casing difficult.

Particularly suitable elastomers are the copolyetheresters disclosed in U.S. Pat. No. 3,860,052, to H. E. Schroeder. Such copolyetheresters contain a multiplicity of long chain ester units and short chain ester units joined head to tail through ester linkages, the esters being derived from a dicarboxylic acid having a molecular weight of less than about 300 and a poly(oxyalkylene) glycol or a glycol, respectively. In the case of the long chain ester, the poly(oxyalkylene) glycol has a number average molecular weight of about 600–3000 and a carbon-to-oxygen atomic ratio of about 2.0–4.3. In the case of the short chain ester units, the glycol has a molecular weight of less than about 250. The short chain ester units constitute about 35–95 weight percent of the copolyetherester, and at least 70% of the short chain diol groups are 1,4-butylene groups; while at least 70% of the dicarboxylic acid groups in the combined long and short ester units are terephthalic acid groups. Copolyetherester elastomer of this type is available commercially from E. I. du Pont de Nemours and Company under the tradename Hytrel.

Useful polyurethanes also are described in the above-cited Schroeder patent. They include castable liquid prepolymers or thermoplastic elastomers which can be cast or molded. A typical polyurethane is a liquid isocyanato-terminated polyether having about 6.3 weight percent —NCO groups and made by mixing one mole of poly(tetramethylene oxide) glycol having a number average molecular weight of 1000, with two moles of 2,4-toluenediisocyanate and heating 3–4 hours at 80°C. These polyurethanes can be cured by mixing with an organic compound having at least two active hydrogen atoms — for example, a diol or a diamine — and allowing the mixture to stand until a solid capable of being molded is obtained. Final cure by heating under pressure is necessary if the initially cured material still contains free —NCO groups. Many suitable polyurethane prepolymers and several suitable curing agents are commercially available from several sources.

The thermoplastic elastomer used for the fabrication of the inner chamber can be in either an oriented or unoriented state. If the elastomer is oriented, the orientation can be either monoaxial or biaxial. If monoaxial, the orientation should be aligned in the radial direction. Methods of orientation of polymers are well known to the art and usually involve heating and cooling the polymer article in a stretched or compressed condition. While orientation has been particularly well known in the art of plastic film and fiber manufacture, it also has been described in the elastomer field. Relevant art dealing with polymer orientation includes, for example, U.S. Pat. Nos. 3,257,489 to Heffelfinger and 3,758,442 to Shima et al.; and Canadian Patent 621,569 to Moody. Oriented elastomers are stronger and more resistant to creep than unoriented elastomers, and an inner chamber made from an oriented elastomer would provide equally satisfactory performance with thinner walls.

The safety tire of the present invention is for operation inflated to a working pressure of about 24–30 psi per chamber. While it is not necessary to maintain identical pressures in both chambers, such a procedure is recommended. When the casing is punctured, the inner chamber has sufficient strength to permit continuing operation of the vehicle at normal or nearly normal speeds for up to about 100 miles. The casing can be repaired in the manner in which tubeless tires are usually repaired when punctured, that is, by inserting an elastomer plug into the puncture and cementing it in place with a suitable elastomer adhesive. If both the casing and the inner chamber are punctured, an event that is less likely to happen, the combined thicknesses of the casing and the inner chamber in the tread area will allow the driver to continue operating the car at about 40–50 mph for a distance of up to about 40–50 miles. However, in such a case, it is recommended that the repair be made promptly to avoid damage to the tire when running flat for an extended time. The tire will have to be removed from the rim and reinstalled. The inner chamber is repaired using heat welding or solvent welding techniques to close the puncture. Because of the ability of the tires of the present invention to run flat after damage for a reasonable distance, the need for a spare tire is eliminated. In practice, the operator will always be able to reach a service station on his own power and without changing wheels.

I claim:

1. A pneumatic automotive safety tire assembly adaptable to being seated on a standard wheel rim, said assembly consisting of:
   a. a nonporous, fiber-reinforced casing having a tread, sidewalls, and beads, and
   b. a toroidally shaped inner chamber located within said casing and having no fabric reinforcement; the size of said chamber being more than 50% of the volume within the casing, when each is inflated to an operating pressure of about 24–30 psig;

said inner chamber being constructed of a thermoplastic elastomer selected from copolyetheresters and polyurethanes which exhibit a strain of not more than 10% subjected to a tensile stress of 300 psi for 1 minute at 91°C. and not more than 15% for 100 minutes at 91°C., the thickness of the inner chamber adjacent the sidewall and tread areas of the casing being such that the vector sum of the principal strains of the chamber in those areas at an inflation pressure of 24 psig is not greater than 10%, and the maximum creep at 24 psig at a temperature of 91°C. after 100 minutes is 5%;

said casing and inner chamber being inflatable through separate valves.

2. A safety tire assembly of claim 1 wherein the size of the inner chamber is about 70–80% of the volume within the casing, when each is inflated to an operating pressure of about 24–30 psig.

3. A safety tire assembly of claim 1 wherein the maximum creep of the inner chamber at 24 psig at 91°C. after 100 minutes adjacent the sidewalls of the casing and at the apogee is 3%.

4. A safety wire assembly of claim 1 wherein the thermoplastic elastomer of which the inner chamber is constructed exhibits a strain of not more than 10% when subjected to a tensile stress of 500 psi for 1 minute at 91°C.

5. A safety tire assembly of claim 1 wherein the casing is fitted in one of the sidewalls with a valve through which said casing can be inflated with a needle inflator.

6. A safety tire assembly of claim 1 wherein the inner chamber has a thicker wall at the apogee than in the areas adjacent the sidewalls of the casing.

7. A safety tire assembly of claim 6 wherein the walls of the inner chamber adjacent the bead areas of the casing are thicker than in the areas adjacent the sidewalls of the casing.

8. A safety tire assembly of claim 1 wherein the inner chamber is made of an oriented thermoplastic elastomer.

9. A safety tire assembly of claim 8 wherein the elastomer is oriented biaxially.

10. A safety tire assembly of claim 8 wherein the elastomer is oriented monoaxially.

11. A safety tire assembly of claim 10 wherein the elastomer orientation is aligned in the radial direction.

12. A safety tire assembly of claim 1 wherein the casing is a radially fiber-reinforced tire.

13. A safety tire assembly of claim 1 wherein the vector sum of the principal strains of the inner chamber in the rim area at an inflation pressure of 24 psig is at least 20%.

14. An automotive wheel assembly consisting of:
a. a rim,
b. a nonporous, fiber-reinforced casing seated on said rim, said casing having a tread, sidewalls, and beads, and
c. a toroidally shaped inner chamber seated on said rim within said casing, said inner chamber having no fabric reinforcement; its size being more than 50% of the volume within said casing, when each is inflated to an operating pressure of about 24–30 psig;

said inner chamber being constructed of a thermoplastic elastomer selected from copolyetheresters and polyurethanes which exhibit a strain of not more than 10% when subjected to a tensile stress of 300 psi for 1 minute at 91°C. and not more than 15% for 100 minutes at 91°C., the thickness of the inner chamber adjacent the sidewall and tread areas of the casing being such that the vector sum of the principal strains of the chamber in those areas at an inflation pressure of 24 psig is not greater than 10%, and the maximum creep at 24 psig at a temperature of 91°C. after 100 minutes is 5%;

said casing and inner chamber being inflatable through separate valves.

15. A wheel assembly of claim 14 wherein the size of the inner chamber is about 70–80% of the volume within the casing, when each is inflated to an operating pressure of about 24–30 psig.

16. A wheel assembly of claim 14 wherein the maximum creep of the inner chamber at 24 psig at 91°C. after 100 minutes adjacent the sidewalls of the casing and at the apogee is 3%.

17. A wheel assembly of claim 14 wherein the thermoplastic elastomer of which the inner chamber is constructed exhibits a strain of not more than 10% when subjected to a tensile stress of 500 psi for 1 minute at 91°C.

18. A wheel assembly of claim 14 wherein the casing is fitted in one of the sidewalls with a valve through which said casing can be inflated with a needle inflator.

19. A wheel assembly of claim 14 wherein the inner chamber has a thicker wall at the apogee than in the areas adjacent the sidewalls of the casing.

20. A wheel assembly of claim 19 wherein the walls of the inner chamber adjacent the bead areas of the casing are thicker than in the areas adjacent the sidewalls of the casing.

21. A wheel assembly of claim 14 wherein the inner chamber is made of an oriented thermoplastic elastomer.

22. A wheel assembly of claim 21 wherein the elastomer is oriented biaxially.

23. A wheel assembly of claim 21 wherein the elastomer is oriented monoaxially.

24. A wheel assembly of claim 23 wherein the elastomer orientation is aligned in the radial direction.

25. A wheel assembly of claim 14 wherein the casing is a radially fiber-reinforced tire.

26. A wheel assembly of claim 14 wherein the vector sum of the principal strains of the inner chamber in the rim area at an inflation pressure of 24 psig is at least 20%.

* * * * *

UNITED STATES PATENT OFFICE
CERTIFICATE OF CORRECTION

PATENT NO. : 3,941,176
DATED : March 2, 1976
INVENTOR(S) : Harold Gordon Schwartz It is certified that error appears in the above-identified patent and that said Letters Patent are hereby corrected as shown below:

In Column 5, line 6, insert "when" between "10%" and "subjected'

In Column 5, line 26, change "wire" to "tire".

Signed and Sealed this

Fifth Day of October 1976

[SEAL]

Attest:

RUTH C. MASON
*Attesting Officer*

C. MARSHALL DANN
*Commissioner of Patents and Trademarks*